United States Patent
Smith et al.

[11] Patent Number: 5,358,203
[45] Date of Patent: * Oct. 25, 1994

[54] WRIST REST

[75] Inventors: Mark R. Smith, Palo Alto; Philip G. Wessells, Menlo Park, both of Calif.

[73] Assignee: Silicon Sports, Inc., Menlo Park, Calif.

[*] Notice: The portion of the term of this patent subsequent to Mar. 30, 2010 has been disclaimed.

[21] Appl. No.: 6,225

[22] Filed: Jan. 19, 1993

Related U.S. Application Data

[63] Continuation of Ser. No. 690,742, Apr. 24, 1991, Pat. No. 5,197,699.

[51] Int. Cl.$^5$ .................................. B68G 5/00
[52] U.S. Cl. ..................................... 248/118; 400/715
[58] Field of Search .................. 248/118, 118.1, 118.3, 248/118.5, 918; 400/715, 412

[56] References Cited

U.S. PATENT DOCUMENTS

| | | | |
|---|---|---|---|
| 4,481,556 | 11/1984 | Berke et al. | 361/222 |
| 4,482,063 | 11/1984 | Berke et al. | 248/118 |
| 4,545,554 | 10/1985 | Latino et al. | 248/118.3 X |
| 4,621,781 | 11/1986 | Springer | 248/118 |
| 4,709,972 | 12/1987 | La Budde et al. | 312/208 |
| 4,973,176 | 11/1990 | Dietrich | 248/118 X |
| 5,022,622 | 6/1991 | Schaevitz | 248/231.7 |
| 5,056,743 | 10/1991 | Zwar et al. | 248/118 |
| 5,163,646 | 11/1992 | Engelhardt | 248/118 |
| 5,197,699 | 3/1993 | Smith et al. | 248/118 |

FOREIGN PATENT DOCUMENTS

| | | | |
|---|---|---|---|
| 2148853 | 3/1973 | France | 248/118 |

OTHER PUBLICATIONS

Keyboard Wrist Rest Brochure; Ali Med, Inc; 1990 Product 1011.
Key Pads Brochure; American Covers Inc.
Keyboard Buddy Brochure; Computer Expressions.
Wrist Supports Brochure; M&M Industries.
Wrist Pro Brochure; Wrist Pro.
Wristonics Brochure; Marcus Franklin & Associates.
Wrist-Stop Brochure; George McDonald Engineering Co., Inc.; 1990.
Wrist Pad Plus Brochure; Marty's Computer Workshop.
Keyboard Wrist Rest Brochure; Global Computer Supplies.
Curtis Wrist Rest Brochure; Curtis Manufacturing, Inc.

*Primary Examiner*—Ramon O. Ramirez
*Attorney, Agent, or Firm*—Townsend and Townsend Khourie and Crew

[57] ABSTRACT

A wrist rest (1) of specially designed height and other characteristics is provided for reducing strain on the wrists and hands of a keyboard operator or a similar user of computer accessories. The rest (1) is made to be placed in front of the keyboard or accessory being used, and may be designed to have a particular firmness for comfort. In some embodiments the rest has two foam rubber layers (20,30) about ¾ inch thick total; the bottom surface has no "skin", to prevent the rest from slipping, while the upper surface has a smooth covering (10) so hands may slide around easily and comfortably. In order to allow rests designed for a normal keyboard to be adapted for use with an especially long keyboard, or with an accessory like a mousepad (4), one embodiment (3) of the invention has contours (101) which can interlock with similar contours (100) on an extension pad (2); these contours are also designed to be easily and inexpensively manufactured.

1 Claim, 4 Drawing Sheets

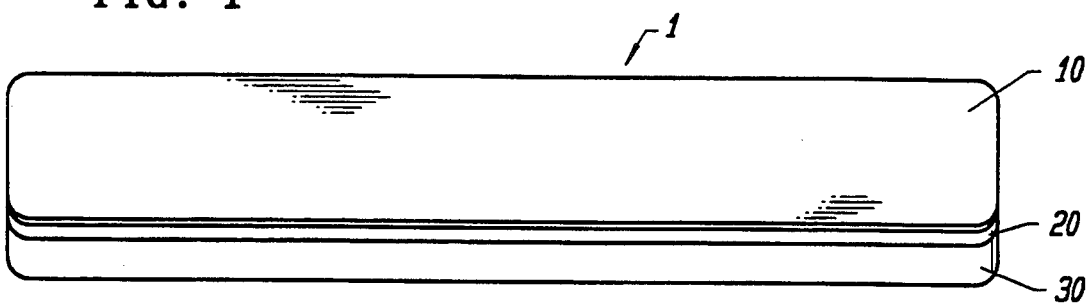
FIG. 1
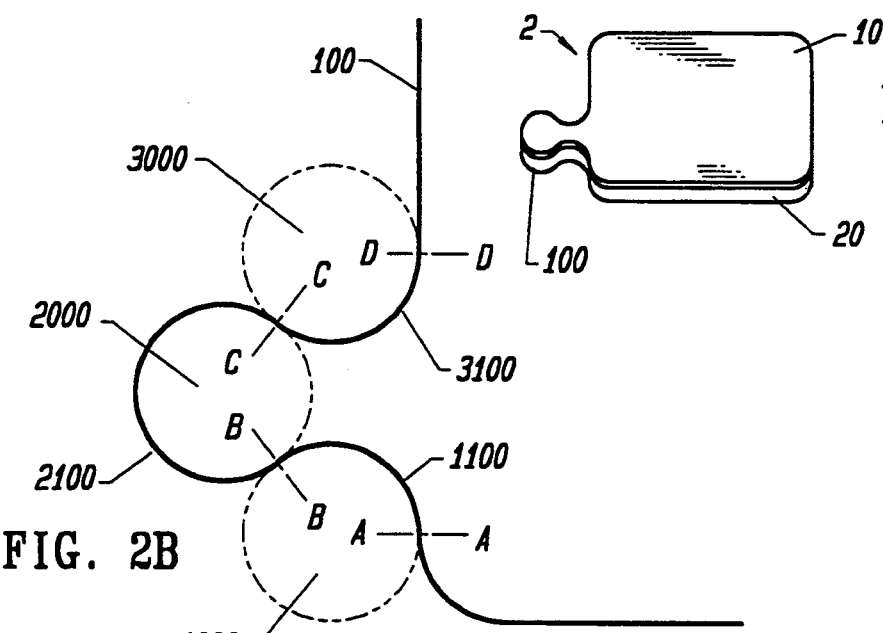
FIG. 2A
FIG. 2B
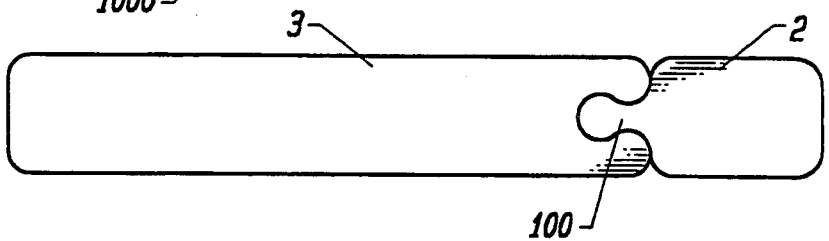
FIG. 3
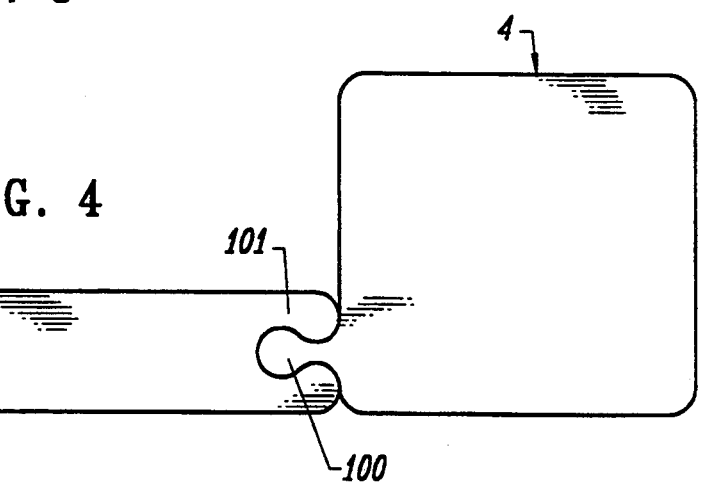
FIG. 4

WRIST REST

This is a continuation of application Ser. No. 07/690,742 filed Apr. 24, 1991, now U.S. Pat. No. 5,197,699.

BACKGROUND OF THE INVENTION

This invention relates generally to pads for computer users to rest their hands on while using accessories such as keyboards, trackballs, and "mice". This invention relates specifically to pads for computer keyboard operators to rest their hands on to reduce stress on the hands, wrists, and arms, most specifically to reduce the risk of developing carpal tunnel syndrome.

Disorders in the upper extremities are frequently seen in people whose jobs require high speed repeated motions. About half of the forty million office workers in the United States alone presently work with video display terminals (VDTs) on the job. As VDT use, both in the numbers of people and the amount of time spent at the VDT, continues to rise in the office place, the number of cases of repetitive stress injury increases apace. Repetitive stress injury is one of the leading occupational health problems of the past decade and shows signs of continued growth in the coming decade.

Repetitive stress injuries resulting from keyboard use can take a number of forms. Steady contraction of the muscles of the upper arms and shoulder-chest region, used to hold the hands and arms outstretched over a keyboard, can lead to muscle fatigue. Muscle fatigue is seldom serious, though, and can be corrected by occasional breaks to rest the arms, and by keeping distances to work materials such as a keyboard to a minimum. Tendons seem susceptible to repetitive stress injury even more so than muscles. Most forms of tendon irritation are either the result of overuse and improper sliding between tendons and other tendons or structures nearby. The resulting inflammation and possible fraying of the tendon can result in the need for extended rest and a change in work habits. Tendonitis, Tenosynovitis, and Epicondylitis are all painful swellings of tendon junctions with muscles, at their point of insertion to the bone, and with their sheaths, respectively. A ganglion is usually a smooth round swelling or inflammation which appears near a joint, such as the wrist, or a tendon sheath; ganglions most often occur on the back of the hand.

More serious tendon injuries include ulnar nerve irritation and carpal tunnel syndrome. Tension on certain flexor muscles in the elbow and wrist can cause compression of the ulnar nerve at the elbow or wrist and result in reduced sensation on the ring and little fingers, as well as loss of dexterity in the hand. Occasionally, such nerve entrapment from repetitive overuse requires surgical release of the nerve. The main nerve of the hand, the median nerve, passes through a narrow tunnel through the wrist formed on the top by the wrist bones and on the bottom by a ligament. The channel, called the "carpal tunnel" also houses the tendons from the forearm muscles responsible for curling or closing the hand and fingers. Blood vessels in the hand also pass through the carpal tunnel. When the hands are bent back or forward sharply there is a three-fold increase in the pressure in the carpal tunnel in comparison to a straight alignment of the hands. The carpal tunnel can be visualized as a straw; when a straw is bent it flattens out and compresses. This increase in carpal tunnel compression may damage the median nerve at this site. Furthermore, the lubrication lining around the tendons may become thick, sticky and swollen due to the wear and tear of repetitive hand movements, thus pressing the nerve against the tunnel. Blood vessels, as well, can be damaged. For some reason, many of the symptoms of repetitive stress injury appear at night or early in the morning and so frequently are not assumed to be related to repetitive motions during the day. A mild case of carpal tunnel syndrome costs $5,000 to $10,000 in medical care and lost work time, according to a study by the American Physical Therapy Association. If not caught in time, surgery often becomes necessary; costs, including surgery to both hands, may rise to $100,000.

From the above it is seen that a device and technique for reducing some of the risk of damage due to frequent computer/keyboard use is desired.

SUMMARY OF THE INVENTION

The present invention provides a wrist support pad, or wrist rest, of specially designed height for reducing strain on the wrists and hands of a keyboard operator or a similar user of computer accessories. The pad is made to be placed in front of the keyboard or accessory being used, and may be designed to have a particular firmness for comfort. In some embodiments the bottom surface has no "skin" to prevent the pad from slipping, while the upper surface has a smooth covering so hands may slide around easily and comfortably. In order to allow pads designed for a normal keyboard to be adapted for use with an especially long keyboard, or with an accessory like a mousepad, one embodiment of the invention has contours which can interlock with similar contours on an extension pad; these contours are also designed to be easily and inexpensively manufactured. A particular embodiment is formed as a wrist rest comprising a support layer having a first compression deflection pressure, a low friction surface layer bonded to the support layer, and a base layer bonded to the support layer and having a second compression deflection pressure, wherein the first deflection compression pressure is lower than the second compression deflection pressure.

A further understanding of the nature and advantages of the invention may be realized by reference to the remaining portions of the specification and the drawings.

BRIEF DESCRIPTION OF THE DRAWINGS

FIG. 1 is a perspective view of a particular embodiment of the present invention;

FIG. 2A is a perspective view of a particular embodiment of an extension pad contoured according to an aspect of the present invention;

FIG. 2B is a diagram illustrating some of the contours of the extension pad of FIG. 2A;

FIG. 3 is a top view of a particular embodiment of a wrist rest joined to the extension pad of FIG. 2, according to an aspect of the present invention;

FIG. 4 is a top view of particular embodiments of a wrist rest and a mousepad contoured according to an aspect of the present invention and joined together;

DETAILED DESCRIPTION OF THE INVENTION

Figure 5A:
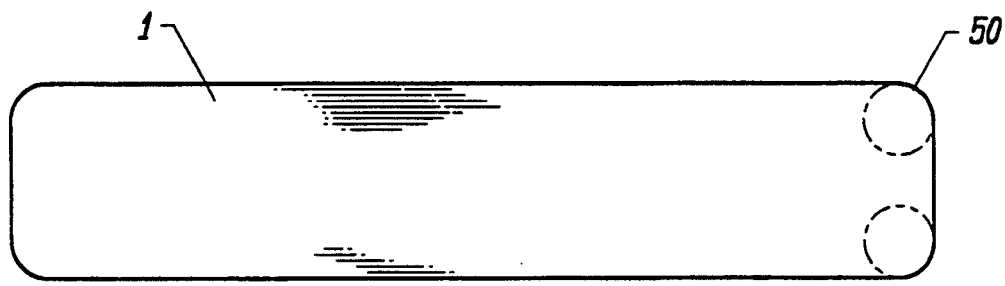
FIGS. 5A and 5B show a design diagram of a wrist rest and a top view of the resultant wrist rest, respectively.

One known option to alleviate the hand and arm stress associated with keyboard activity is the use of an arm or wrist rest. Proper height of a rest as well as its comfort of use are critical to its success in preventing or alleviating keyboard repetitive stress injuries. Prior art keyboard rests tended to be uncomfortable and to have inappropriate thicknesses or support heights. The wrist rest of the present invention is designed to meet these requirements.

A particular embodiment of a wrist rest according to the present invention is shown in FIG. 1, and denoted generally by reference numeral 1. The pad is meant to lie lengthwise in front of a keyboard; it should be long enough to provide support along the entire length, including any numeric keypad, of the keyboard with which it is used. A length of about 19.5 inches is suitable for the vast majority of keyboards currently in use. Together with length, depth frames the surface of the pad. Unless tailored for a specific individual, the pad's depth should provide comfortable support for both large and small hands; about 4 inches is suitable for general use.

A critical dimension of the pad is the thickness. The thickness should be chosen so that while typing, users can comfortably rest their wrists or the heels of their hands on the pad and keep the wrist joints supported at a healthy angle so as to minimize damaging stress caused and exacerbated by compression of nerves and tendons in the carpal tunnel. The least amount of strain is put on the wrist joints when the hand extends level from the forearm, and within a range of about five to ten degrees in either direction; the smaller the angle, the less the strain. The wrist angle should be maintained within this range, particularly within 5 degrees, as much as possible throughout the entire extent of hand movements at the keyboard. The proper thickness for the wrist rest is thus directly tied to the height of the keyboard or other device with which the pad is to be used. The basic rule is that the rest should be about equal in height to the front of the keyboard. A particular embodiment of the present invention is designed to maintain the proper wrist angle with the majority of computer keyboards in commercial use, in which case thicknesses from about ½ inch to 1 inch can be used, with a thickness of about ⅝ inch to ⅞ inch being better, and ¾ inch most preferred. The physical dimensions of the wrist rest are not the only significant characteristics of the pad, however.

The wrist rest must not only provide support at the proper height, but must also be comfortable enough that users actually do rest their wrists on the pad during substantially all keyboard use. The wrist rest 1 of FIG. 1 has three layers. A low friction surface layer 10 is provided to allow the hand easy travel along the length of the keyboard. By "low friction" it is meant that the skin to surface friction is low enough that the hand can slide relatively freely, without inclining users to lift their hands when moving them. Surface layer 10 can also help prevent heat buildup and sweating, and may be soft to the touch. Materials such as nylon, polyester, and Lycra TM (DuPont) are examples of materials suitable for the surface layer; these may be used in a woven cloth form and are of negligible thickness.

Underneath surface layer 10 and bonded to it is a support layer 20. This layer needs to be firm enough to provide proper support for the hands, yet be supple enough to be comfortable. Foam rubber (or sponge rubber or rubber sponge) is a good material for the support layer; neoprene (wet-suit material) being particularly suitable. The compression-deflection pressure of support layer 20 should be at least about 2 psi, and no more than 13 psi. A compression-deflection pressure under 9 psi is preferable, with the most preferable range being about 2–5 psi.

Underneath the support layer may optionally be bonded a base layer, such as layer 30 of FIG. 1. This base layer 30 is preferably firmer than support layer 20, and helps stabilize the pad. A suitable compression-deflection pressure for base layer 30 is greater than about 5 psi, with a preferred range of about 5–9 psi. Hard materials such as wood or plastic may be used, but foam rubbers, and neoprene in particular, work quite well also for the base layer. If neoprene or some other foam rubber which may come with a "skin" (a surface layer formed during the curing process) is used for the bottom layer of the pad, the bottom surface should be "split", or "open", skin (basically, skinless), and can optionally be scored, to give the pad better contact with the desktop or other work surface, so the pad slides around less. If a harder material is used for the base layer, some other contact material beneath it may be necessary to reduce sliding.

FIG. 2A shows an extension pad 2, with only two layers—a surface layer 10 and a support layer 20. The support layer is made as thick as the combined support and base layers of the example of FIG. 1. Surface layer 10 could conceivably be left out as well, provided that the surface of the support layer was smooth and slick enough to allow a user's hand to slide freely across it. An interlocking contour 100 is provided so that the extension pad may be joined with a wrist rest, such as in FIG. 3, which shows extension pad 2 joined to a wrist rest 3. In this embodiment, the radius of curvature of the corners is ¾ inches; the radius of curvature of the arcs used to define interlocking contour 100 is also ¾ inches. FIG. 2B illustrates in more detail interlocking contour 100. Contour 100 is a composite of three arc segments from circles 1000, 2000, and 3000. The radius of curvature of each of these circles is about ¾ inches. Circle 1000 joins the side of pad 2 at a point indicated by segment A—A, therefore having its center ¾" left of that point of joinder. Circle 2000 has its center about 13/16 inches left of and about 1 3/16 inches above the center of circle 1000. Circle 3000 has its center about 2 ⅜ inches directly above the center of circle 1000. These distances are approximate; the circles should meet tangentially at the points indicated by segments B—B and C—C. An arc segment 1100 extends around the lesser portion of circle 1000 from A—A to B—B, where it joins an arc segment 2100. Arc segment 2100 extends around the greater portion of circle 2000 from B—B to C—C, where it joins an arc segment 3100, which extends around the lesser portion of circle 3000 from C—C to D—D. Arc Segments 1100, 2100 and 3100 together form interlocking contour 100.

An extension pad will be particularly useful if the keyboard is exceptionally wide, or if an auxiliary device such as a track ball is positioned next to the keyboard; a typical width for such an extension pad is around six inches. The interlocking contours help keep the extension pad in place, and interlocking contours can also be used to join a wrist rest to a mousepad, as in FIG. 4, which shows wrist rest 3 joined to mousepad 4. Such interlocking keeps the mousepad secure and provides continuous support for the wrist. One advantage of such interlocking pads over a wrist rest formed integrally with a mousepad is that with the interlock feature the same wrist rest may be used with either a right-handed or left-handed mousepad simply by being rotated 180° with the surface remaining face up.

Figure 5B:
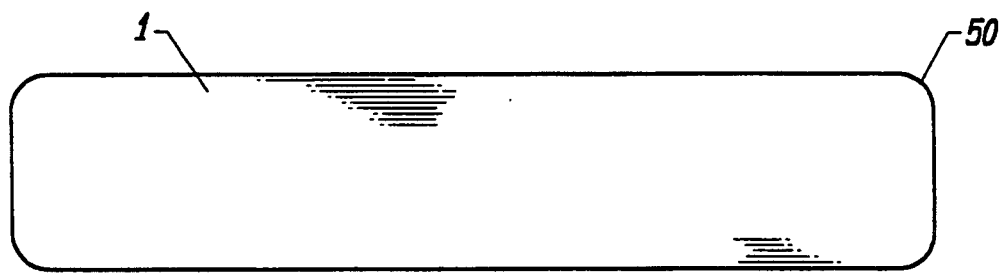
Figure 6A:
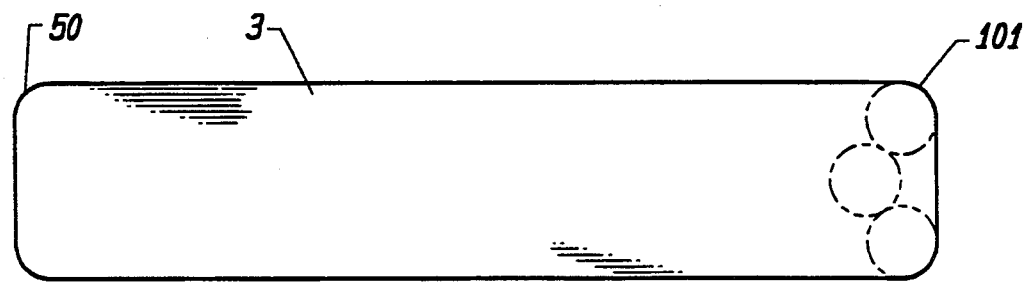
FIGS. 6A and 6B show a design diagram of a wrist rest with interlocking contours and a top view of the resultant wrist rest, respectively.
Figure 6B:
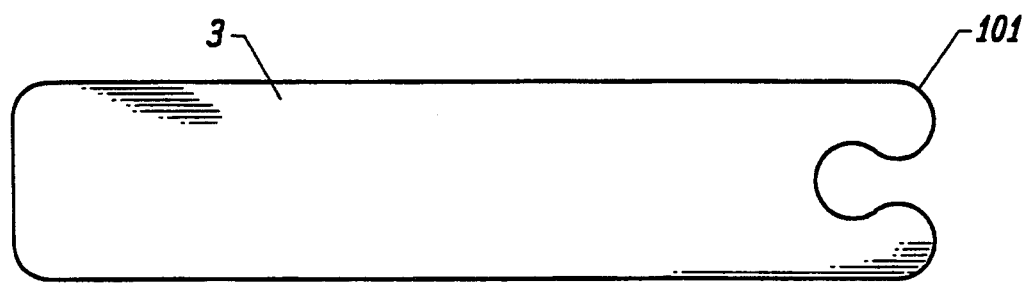
Figure 7A:
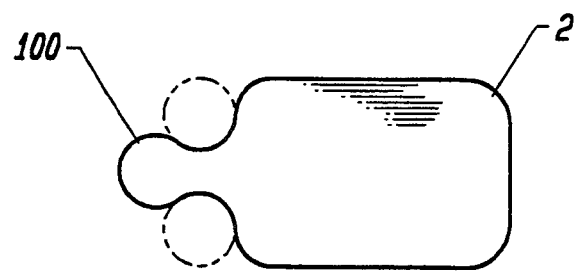
FIGS. 7A and 7B show a design diagram of an extension pad with interlocking contours and a top view of the resultant extension pad, respectively.
Figure 7B:
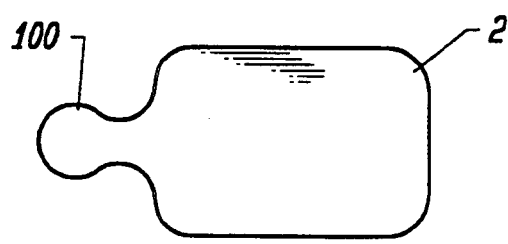
Figure 8A:
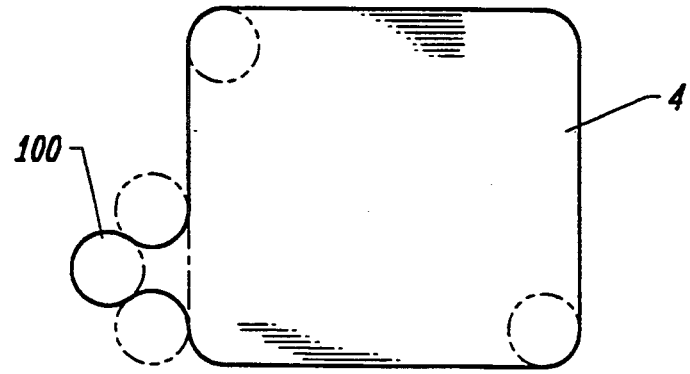
FIGS. 8A and 8B show a design diagram of a mousepad with interlocking contours and a top view of the resultant mousepad, respectively.
Figure 8B:
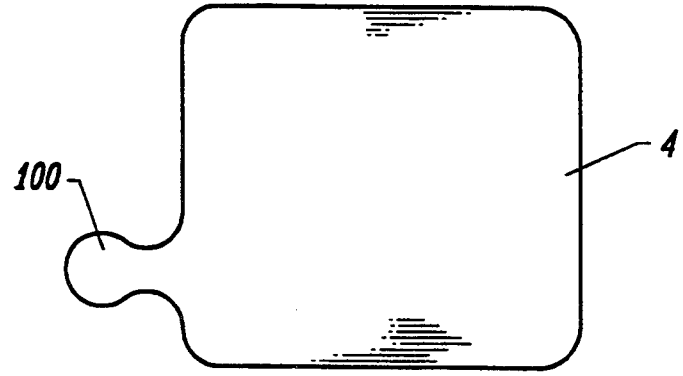

FIGS. 5A and 5B show a design diagram of an wrist rest 1 with rounded corners 50, and a top view of the resultant wrist rest, respectively. The radius of curvature of the corners is ⅜ inches. FIGS. 6A and 6B show a design diagram of an wrist rest with an interlocking contour and a top view of the resultant wrist rest, respectively. Again, the radius of curvature of the corners is ⅜ inches; the radius of curvature of arcs used to define an interlocking contour 101 is also ⅜ inches. It is formed in the same general manner as contour 100, described above, but it extends into the pad as a hole rather than out from it as a projection. FIGS. 7A, 7B and 8A, 8B show similar diagrams for an extension pad and a mousepad, respectively. Having the accessory pads interlock with the wrist rest assures a close fit and an even surface so the user's hand may slide freely across from one to another. The formation of the interlocking contours has high aesthetic appeal as well as having manufacturing benefits such as about 15 percent less wasted material and more compact shipping. The curves may be cut into neoprene by using a swing arm clicker press, a travelling head press, or a full head press, with steel rule dies.

Figure 9:
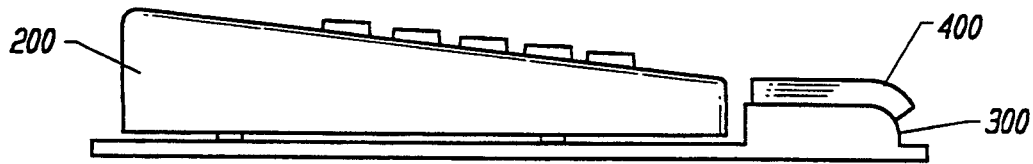
FIG. 9 shows a side view of a prior art wrist rest with a particular embodiment of a novel support pad attached on top, in front of a keyboard.
Figure 10:
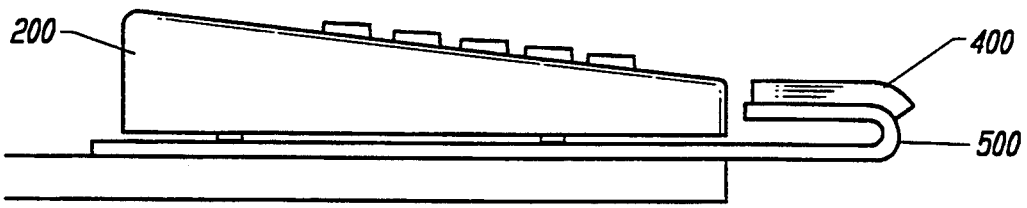
FIG. 10 shows a side view of a wrist rest with a particular embodiment of a novel support pad attached on top, in front of a keyboard.

FIG. 9 shows a keyboard 200 with a prior art wrist rest 300, many of which are about ½ inch high. In order to compensate for this low height, a support pad 400 is glued onto the wrist rest 300; this may be done with an adhesive layer on the bottom of the support pad. Support pad 400 may extend around the front of wrist rest 300 as shown here, or it may cover only the top surface. It is manufactured in the same manner as the previously described wrist rest of the present invention, but it is generally made without a base layer and has a total height of about ¼ inch. This ¼ inch height plus the ½ inch height of the prior wrist rest combine to make a support surface ¾ inch high, ideal for most keyboards. FIG. 10 shows a keyboard and a support pad 400 attached to another wrist rest 500, which has a recurve portion in front.

Figure 11:
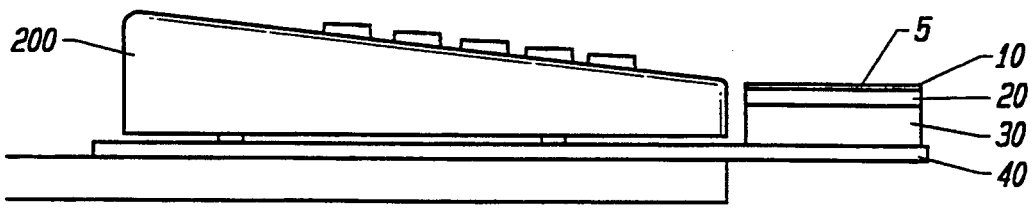
FIG. 11 shows a side view of a particular embodiment of a wrist rest with an anchor plate according to an aspect of the present invention, in front of a keyboard.

FIG. 11 shows a keyboard 200, and in front and underneath it a wrist rest 5. Wrist rest 5 has a surface layer 10, a support layer 20, a base layer 30, and an anchor plate 40. Anchor plate 40 slides under the keyboard and allows the wrist rest to be positioned in front of a keyboard with no support directly underneath the wrist rest.

Figure 12:
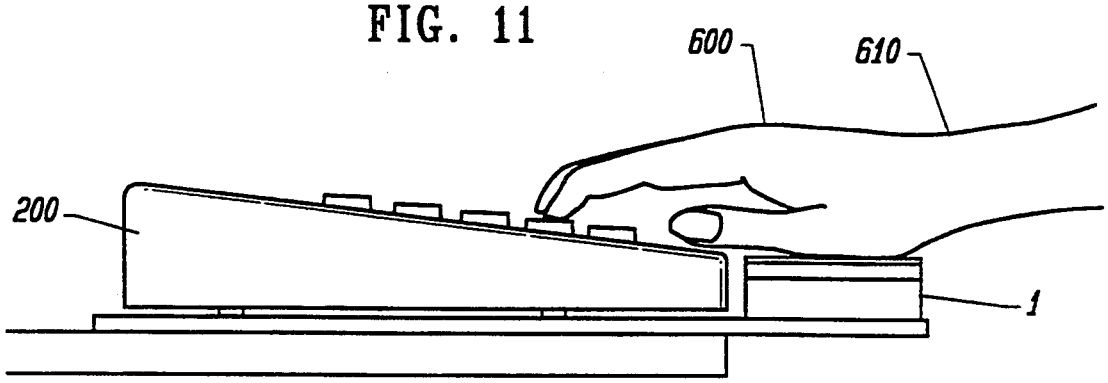
FIG. 12 shows a side view of a particular embodiment of a wrist rest according to an aspect of the present invention, with a user's hand resting on the wrist rest and keyboard.

FIG. 12 shows a wrist rest 1 in front of a keyboard 200. Also shown is a user's hand 600 in normal position on the wrist rest and keyboard. The user's wrist 610 is supported nearly level, with almost no deflection angle.

Some difficulties may arise in the manufacture of foam rubber pads such as these. Typical problems include lingering odor after manufacture, and warpage resulting from different layers being bonded together. Neoprene fortunately has basically no odor, a distinct advantage over most other foam rubbers, which retain a strong odor. Even with neoprene, an odor may be caused by the glue employed to bond layers, in which case aging the wrist rest in the sun may help reduce this glue odor. One way of reducing or solving the warpage problem is to heat age the materials before manufacture so there will be no differential shrinking of different layers during manufacture. An alternative method is simply to employ materials with the same heat shrinkage characteristics.

It is to be understood that the above description is intended to be illustrative and not restrictive. Many embodiments will be apparent to those of skill in the art upon reviewing the above description. For instance, the interlocking contours could be formed in a dovetail shape. The scope of the invention should, therefore, be determined with reference to the appended claims, along with the full scope of equivalents to which such claims are entitled.

What is claimed is:

1. A wrist rest having a length, depth, and thickness, comprising:
   a) a support layer;
   b) a low friction surface layer bonded to the support layer; and
   c) a base layer bonded to the support layer and having a first compression deflection pressure, wherein the support layer has a second compression deflection pressure, the first deflection compression pressure being higher than the second compression deflection pressure, wherein the thickness of the wrist rest is about from ½ to 1 inches.

* * * * *